United States Patent
Youm (10) Patent No.: US 11,724,202 B2
(45) Date of Patent: Aug. 15, 2023

(54) SERVER AND METHOD FOR GENERATING COLLABORATION CONTENT IN ASYNCHRONOUS MANNER

(71) Applicant: XOGAMES INC., Seongnam-si (KR)

(72) Inventor: Eui Joon Youm, Seongnam-si (KR)

(73) Assignee: XOGAMES INC., Seongnam-si (KR)

( * ) Notice: Subject to any disclaimer, the term of this patent is extended or adjusted under 35 U.S.C. 154(b) by 18 days.

(21) Appl. No.: 17/534,339

(22) Filed: Nov. 23, 2021

(65) Prior Publication Data

US 2022/0249960 A1 Aug. 11, 2022

(30) Foreign Application Priority Data

Feb. 8, 2021 (KR) .................. 10-2021-0017527

(51) Int. Cl.
*A63F 13/814* (2014.01)
*G06F 16/901* (2019.01)
*A63F 13/847* (2014.01)

(52) U.S. Cl.
CPC .......... *A63F 13/814* (2014.09); *A63F 13/847* (2014.09); *G06F 16/9027* (2019.01)

(58) Field of Classification Search
CPC .................. A63F 13/814; A63F 13/847; A63F 2300/8047; G06F 16/9027
USPC ......................................................... 463/42
See application file for complete search history.

(56) References Cited

U.S. PATENT DOCUMENTS

| 7,935,877 B2 * | 5/2011 | Lemons | G10H 1/0025 345/23 |
| 10,929,092 B1 * | 2/2021 | Karroll, Jr. | G10H 1/0058 |
| 2009/0106429 A1 * | 4/2009 | Siegal | G11B 27/034 709/227 |
| 2012/0057842 A1 * | 3/2012 | Caligor | G10H 1/0058 386/E5.032 |
| 2019/0261041 A1 * | 8/2019 | Swenson | G11B 27/031 |
| 2019/0355336 A1 * | 11/2019 | Steinwedel | H04L 12/1813 |

FOREIGN PATENT DOCUMENTS

| CA | 2489256 A1 * | 6/2006 | .......... G10H 1/0058 |
| KR | 20150059219 | 6/2015 | |
| KR | 20170046116 | 4/2017 | |
| KR | 101903273 | 10/2018 | |
| WO | WO-2005031697 A1 * | 4/2005 | .......... G10H 1/0058 |

* cited by examiner

*Primary Examiner* — Allen Chan
(74) *Attorney, Agent, or Firm* — Cantor Colburn LLP

(57) ABSTRACT

A collaboration content-generating server that generates collaboration content item in an asynchronous manner includes a database configured to store a collaboration content including a base content corresponding to a root node and a plurality of additional contents corresponding to a plurality of nodes divided from and connected to the root node in a tree structure; an additional content receiving unit configured to receive, from a first user device, a node selected by the first user device and a first additional content that is supplementary to a first collaboration content corresponding the selected node; and a collaboration content generating unit configured to generate a second collaboration content based on the first additional content and the first collaboration content. The collaboration content is generated based on the base content and the plurality of additional contents received at different times from a plurality of user devices.

19 Claims, 9 Drawing Sheets

| COLLABORATION CONTENT | TYPE OF ADDITIONAL CONTENT |
|---|---|
| FIRST COLLABORATION CONTENT | DRUM PLAY SOUND SOURCE 301, PIANO PLAY SOUND SOURCE 303 |
| SECOND COLLABORATION CONTENT | DRUM PLAY SOUND SOURCE 301, PIANO PLAY SOUND SOURCE 303, SAXOPHONE PLAY SOUND SOURCE 305 |
| THIRD COLLABORATION CONTENT | DRUM PLAY SOUND SOURCE 301, PIANO PLAY SOUND SOURCE 303, FIRST VOCAL SOUND SOURCE 307 |

FIG. 4B

| COLLABORATION CONTENT | TYPE OF ADDITIONAL CONTENT |
|---|---|
| FIRST COLLABORATION CONTENT | DRUM PLAY SOUND SOURCE 301, PIANO PLAY SOUND SOURCE 303 |
| SECOND COLLABORATION CONTENT | DRUM PLAY SOUND SOURCE 301, PIANO PLAY SOUND SOURCE 303, SAXOPHONE PLAY SOUND SOURCE 305 |
| THIRD COLLABORATION CONTENT | DRUM PLAY SOUND SOURCE 301, PIANO PLAY SOUND SOURCE 303, FIRST VOCAL SOUND SOURCE 307 |
| FOURTH COLLABORATION CONTENT | DRUM PLAY SOUND SOURCE 301, PIANO PLAY SOUND SOURCE 303, FIRST VOCAL SOUND SOURCE 307, SECOND VOCAL SOUND SOURCE 309 |

SERVER AND METHOD FOR GENERATING COLLABORATION CONTENT IN ASYNCHRONOUS MANNER

TECHNICAL FIELD

The present disclosure relates to a server and method for generating collaboration content in an asynchronous manner.

BACKGROUND

In general, collaboration is the process of two or more people working together in an offline space to perform a specific task and thus is an inefficient process with geographical distance and time constraints. However, with the advancement of network technology, it has been made possible to conduct collaboration in an online space.

If, for example, a musical content for which time synchronization is important is produced by collaboration of a plurality of content-producing devices in an online space, it is very difficult to conduct collaboration in an online space because the devices receive data at different times due to data transfer variations.

For example, if a plurality of users sings a song and plays musical instruments with accompaniment from another user on the other side of the world, a joint performance cannot be done well due to disagreement in timing caused by data transfer variations.

For this reason, interactions, such as a joint performance, cannot be easily done in the Internet environment with variations in data arrival rate.

PRIOR ART DOCUMENT

Patent Document

Patent Document 1: Korean Patent No. 10-1903273 (registered on Sep. 20, 2018)

SUMMARY

In view of the foregoing, the present disclosure is intended to receive, from a first user device, a first additional content that is supplementary to a first collaboration content selected from among collaboration contents generated based on a base content and a plurality of additional contents received at different times from a plurality of user devices, and to generate a second collaboration content based on the first collaboration content and the first additional content.

The problems to be solved by the present disclosure are not limited to the above-described problems. There may be other problems to be solved by the present disclosure.

According to an aspect of the present disclosure, a collaboration content-generating server that generates collaboration content item in an asynchronous manner includes a database configured to store a collaboration content including a base content corresponding to a root node and a plurality of additional contents corresponding to a plurality of nodes divided from and connected to the root node in a tree structure; an additional content receiving unit configured to receive, from a first user device, a node selected by the first user device and a first additional content that is supplementary to a first collaboration content corresponding the selected node; and a collaboration content generating unit configured to generate a second collaboration content based on the first additional content and the first collaboration content. The collaboration content is generated based on the base content and the plurality of additional contents received at different times from a plurality of user devices.

According to another aspect of the present disclosure, a method for generating collaboration content in an asynchronous manner by a collaboration content-generating server includes storing, in a database, a collaboration content including a base content corresponding to a root node and a plurality of additional contents corresponding to a plurality of nodes divided from and connected to the root node in a tree structure; receiving, from a first user device, a node selected by the first user device and a first additional content that is supplementary to a first collaboration content corresponding the selected node; and generating a second collaboration content based on the first collaboration content and the first additional content. The collaboration content is generated based on the base content and the plurality of additional contents received at different times from a plurality of user devices.

The above-described aspects are provided by way of illustration only and should not be construed as liming the present disclosure. Besides the above-described embodiments, there may be additional embodiments described in the accompanying drawings and the detailed description.

According to the embodiments of the present disclosure, it is possible to receive, from a first user device, a first additional content that is supplementary to a first collaboration content selected from among collaboration contents generated based on a base content and a plurality of additional contents received at different times from a plurality of user devices, and to generate a second collaboration content based on the first collaboration content and the first additional content.

Thus, according to the embodiments of the present disclosure, even in the Internet environment with high variations in data arrival rate or even if there are a lot of users who wants to participate in collaboration content, the users can generate collaboration content while interacting each other because the collaboration content is generated in an asynchronous manner.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a terminal or device may be carried out by a server connected to the terminal or device. Likewise, a part of an operation or function described as being carried out by a server may be carried out by a terminal or device connected to the server.

Hereinafter, an exemplary embodiment of the present disclosure will be described in detail with reference to the accompanying configuration views or process flowcharts.

Figure 1:
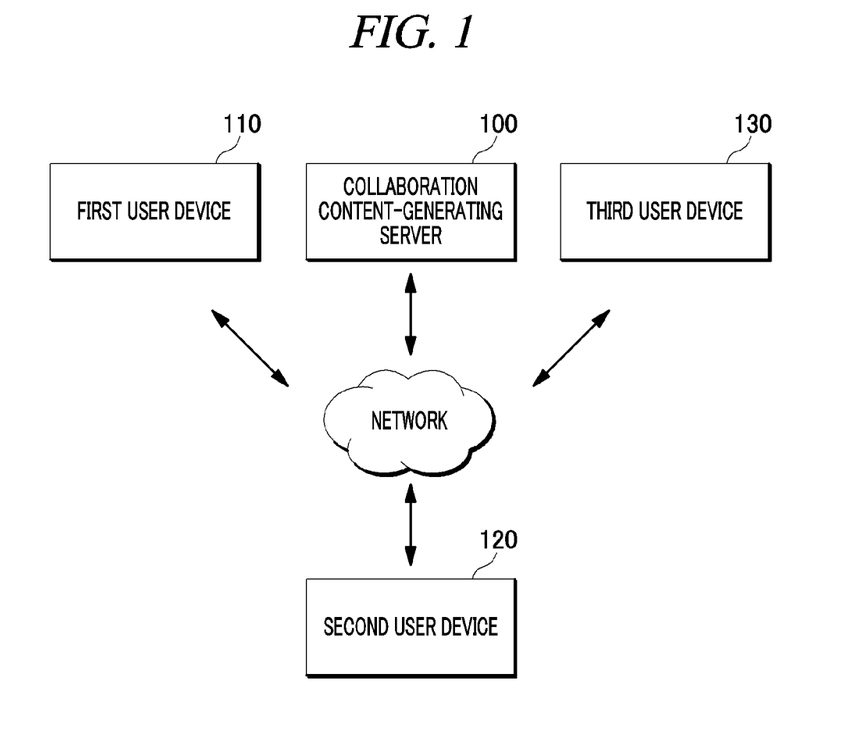
FIG. 1 is a configuration diagram of a collaboration content-generating system according to an embodiment of the present disclosure.

FIG. 1 is a configuration diagram of a collaboration content-generating system according to an embodiment of the present disclosure.

Referring to FIG. 1, a collaboration content-generating system may include a collaboration content-generating server 100, a first user device 110, a second user device 120 and a third user device 130. However, the collaboration content-generating system illustrated in FIG. 1 is just an embodiment of the present disclosure and should not be construed as liming the present disclosure and can be configured differently from that shown in FIG. 1 according to various embodiments of the present disclosure.

The components of the collaboration content-generating system illustrated in FIG. 1 are typically connected to each other via a network (not illustrated). Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The collaboration content-generating server 100 may store, in a database, a collaboration content including a base content corresponding to a root node and a plurality of additional contents corresponding to a plurality of nodes divided from and connected to the root node in a tree structure.

Herein, the term "tree structure" refers to a hierarchical structure of a root node and a plurality of nodes connected thereto. The term "node" is a component constituting the tree structure representing the connection relationship of collaboration contents and refers to a point where an additional content exists. Also, the term "root node" refers to the highest node, which does not have a parent node, among the nodes.

The term "collaboration content" refer to contents generated based on a base content and a plurality of additional contents received at different times from a plurality of user devices. When the collaboration content is provided, at least two of the base content and the plurality of additional contents are simultaneously provided. That is, the collaboration content is generated in an asynchronous manner, but is provided in a synchronous manner.

Herein, the term "synchronous manner" refers to the manner in which the collaboration content-generating server 100 performs wired or wireless communication with the plurality of user devices in real time, and the term "asynchronous manner" refers to the manner in which the plurality of user devices performs wired or wireless communication with the collaboration content-generating server 100 with differences in timing.

A collaboration content may be, for example, a musical content generated by mixing at least one of at least two musical instrument sound sources, vocal sound sources and chorus sound sources as a plurality of additional contents. As another example, a collaboration content may be an image content or a video content generated by mixing at least two images as a plurality of additional contents.

When the first user device 110 selects one of the plurality of nodes, the collaboration content-generating server 100 may receive a first additional content that corresponds to the selected node and is supplementary to a first collaboration content.

The collaboration content-generating server 100 may generate a second collaboration content based on the first collaboration content and the first additional content. Herein, the node for the first additional content may be connected to the lowermost node among the nodes for the plurality of additional contents included in the first collaboration content and may be stored in the database.

After the second collaboration content is generated, the collaboration content-generating server 100 may receive, from the second user device 120, a second additional content that is supplementary to the second collaboration content.

The collaboration content-generating server 100 may generate a third collaboration content based on the second additional content and the second collaboration content received from the second user device 120. Herein, the node for the second additional content may be connected to the node for the first additional content among the nodes for the second collaboration content and may be stored in the database.

When the third user device 130 selects one of the plurality of collaboration contents, the collaboration content-generating server 100 may provide the selected collaboration content to the third user device 130 based on identification information about each of a plurality of additional contents included in the selected collaboration content.

The collaboration content-generating server 100 may synchronize additional contents included in an independently selected collaboration content through the tree connection relationship among the base content and the plurality of additional contents and provide the synchronized additional contents to the third user device 130.

As described above, according to the present disclosure, users, who want to participate in generation of a collaboration content, can independently generate the collaboration content at the time each user wants, and a user, who wants to receive the collaboration content, can be provided with the collaboration content by synchronizing timings of additional contents included in the collaboration content.

For example, as for a musical content in which various sound sources are mixed, users located in different spaces can generate and listen to a musical content (e.g., ensemble, duet, etc.) through the Internet regardless of a network delay time (i.e., data arrival time), and, thus, it is possible to provide the same effect as if the musical content were played in the same place in real time. Also, as for a video content in which two or more dance images are mixed (collaboration content), it is possible to provide the same effect as if many users did dance moves at the same time.

Each of the first user device 110, the second user device 120 and the third user device 130 may include a mobile device capable of performing wireless communication. According to various embodiments of the present disclosure, the first user device 110, the second user device 120 and the third user device 130 may include various forms of devices. For example, each of the first user device 110, the second user device 120 and the third user device 130 may be a portable device capable of accessing a server at a remote location through the network. Herein, examples of the portable device include wireless communication devices that ensure portability and mobility and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) device, smartphone, tablet PC, and the like. However, the user device 110 is not limited to the above-described examples.

Hereinafter, the operations of the respective components of the collaboration content-generating system illustrated in FIG. 1 will be described in more detail.

Figure 2:
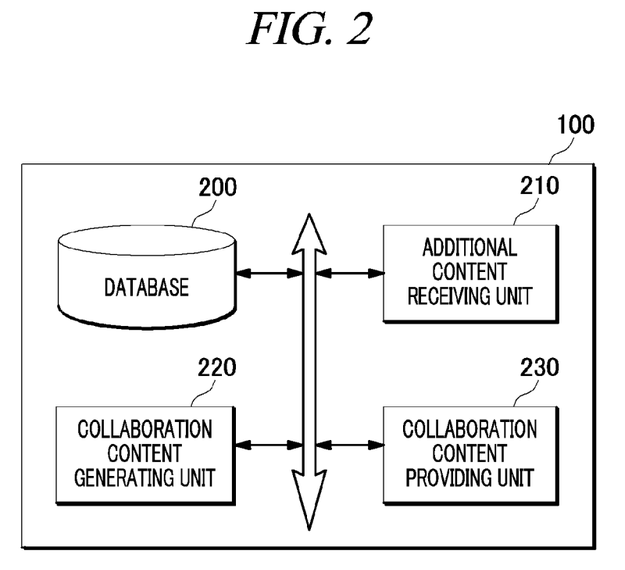
FIG. 2 is a block diagram of a collaboration content-generating server illustrated in FIG. 1 according to an embodiment of the present disclosure.

FIG. 2 is a block diagram of the collaboration content-generating server 100 illustrated in FIG. 1 according to an embodiment of the present disclosure.

Referring to FIG. 2, the collaboration content-generating server 100 may include a database 200, an additional content receiving unit 210, a collaboration content generating unit 220 and a collaboration content providing unit 230. However, the collaboration content-generating server 100 illustrated in FIG. 2 is just one of embodiments of the present disclosure and can be modified in various ways based on the components illustrated in FIG. 2.

Hereinafter, FIG. 2 will be described with reference to FIG. 3A to FIG. 3D and FIG. 4A and FIG. 4B.

The database 200 may store a collaboration content including a base content corresponding to a root node and a plurality of additional contents corresponding to a plurality of nodes divided from and connected to the root node in a tree structure.

Herein, the base content refers to a content first registered to generate a collaboration content, and the plurality of additional contents refers to a collaboration content generated using the base content located at a higher node for each additional content or another additional content. Herein, the collaboration contents may be generated based on the base content and the plurality of additional contents received at different times from the plurality of user devices. A collaboration content may be, for example, a musical content generated by mixing at least one of at least two musical instrument sound sources, vocal sound sources and chorus sound sources as a plurality of additional contents. For example, a collaboration content may be an image content (e.g., animation, picture, etc.) or a video content (e.g., movie video, dance video, etc.) generated by mixing at least two images.

Figure 3A:
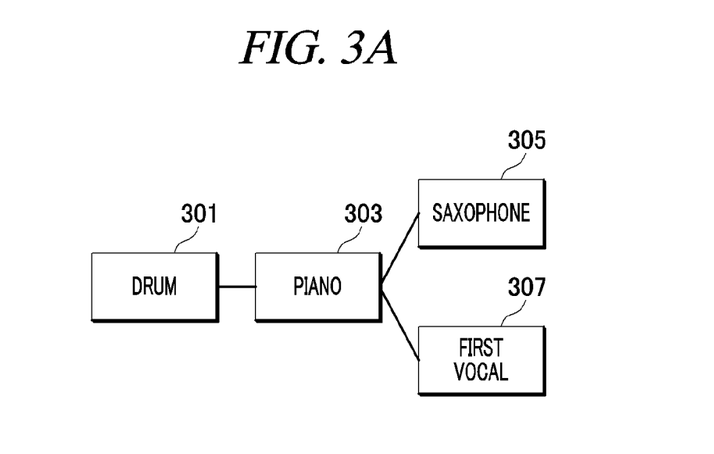
FIG. 3A to FIG. 3D are diagrams provided to explain a method for generating musical collaboration content in an asynchronous manner according to an embodiment of the present disclosure.

For example, referring to FIG. 3A, if a drum play sound source is set as a base content to a root node 301 and a piano play sound source is an additional content to supplement the drum play sound source, the piano play sound source may be set to a lower node 303 derived from the root node 301 and may be connected to the root node 301.

Further, if a saxophone play sound source is an additional content to supplement the piano play sound source, the saxophone play sound source may be set to a lower node 305 derived from the node 303 corresponding to the piano play sound source and may be connected to the node 303 corresponding to the piano play sound source.

Furthermore, if a first vocal sound source is an additional content to supplement the piano play sound source, the first vocal sound source may be set to a lower node 307 derived from the node 303 corresponding to the piano play sound source and may be connected to the node 303 corresponding to the piano play sound source.

The database 200 may store base content information corresponding to the base content and may also store additional content information corresponding to each of the plurality of additional contents. Herein, the base content information may include at least one of identification information (index) of the base content, key information (keyframe flag) indicating whether the base content corresponds to a branch node having a plurality of lower nodes directly connected to the base content, time information (timestamp) of the base content and metadata of the base content.

The additional content information may include at least one of identification information of each additional content, key information indicating whether the additional content corresponds to a branch node having a plurality of lower nodes directly connected to the additional content, identification information of another additional content located at a higher node referred to by the additional content, time information of the additional content and metadata of the additional content.

Herein, the metadata of the base content and the metadata of the additional content may include playdata of a content, length of the content, action count, rating of the content and author information. Herein, the action count refers to count information indicating the number of inputs while the content is generated.

For example, if identification information of a first additional content is "20202" and key information of the first additional content is "true", it means that the first additional content has been referred to by another additional content (e.g., an additional content having identification information of 20203).

For example, if identification information of another additional content located at a higher node referred to by the first additional content is "20201", it means that the first additional content has been generated by the additional content having the identification information of "20201". The database 200 may separately mange and store additional content information of an additional content corresponding to a branch node having lower nodes. Thus, it is possible to efficiently manage a collaboration content including the additional content derived from the branch node.

Referring to FIG. 3A, the branch node may have at least two lower nodes and may be the node 303 corresponding to the piano play sound source.

If a base content is a drum play sound source, the database 200 may store base content information corresponding to the drum play sound source and including "00001" as identification information of the drum play sound source, "TRUE" as key information corresponding to a branch node, "NULL" as identification information of another content referred to by the drum play sound source, "ACE" as an author of the drum play sound source and "2020/02/02 02:02:02" as time information of the drum play sound source.

If an additional content that is supplementary to the drum play sound source is a piano play sound source, the database 200 may store additional content information corresponding to the piano play sound source and including "00002" as identification information of the piano play sound source, "TRUE" as key information corresponding to a branch node, "0001" as identification information of another content referred to by the piano play sound source, "jihye" as an author of the piano play sound source and "2020/02/03 03:03:03" as time information of the piano play sound source.

If an additional content that is supplementary to a collaboration content in which the drum play sound source and the piano play sound source are mixed is a saxophone play sound source, the database 200 may store additional content information corresponding to the saxophone play sound source and including "00003" as identification information of the saxophone play sound source, "FALSE" as key information corresponding to a branch node, "00002" (which is the identification information of the piano play sound source) as identification information of another additional content referred to by the saxophone play sound source, "dyne" as an author of the saxophone play sound source and "2020/03/02. 08:15:15" as time information of the saxophone play sound source.

If an additional content that is supplementary to a collaboration content in which the drum play sound source and the piano play sound source are mixed is a first vocal sound source, the database 200 may store additional content information corresponding to the first vocal sound source and including "0004" as identification information of the first vocal sound source, "FALSE" as key information corresponding to a branch node, "00002" (which is the identification information of the piano play sound source) as identification information of another additional content referred to by the first vocal sound source, "happy" as an author of the first vocal sound source and "2020/02/05. 05:05:05" as time information of the first vocal sound source.

Figure 4A:
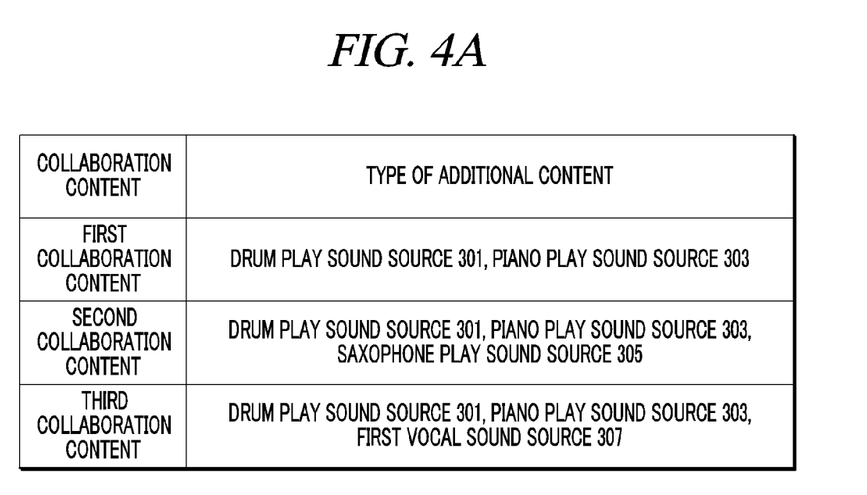
FIG. 4A and FIG. 4B show tables including information about additional contents used for generating a collaboration content according to an embodiment of the present disclosure.

Referring to FIG. 3A and FIG. 4A together, the database 200 may store a collaboration content table in which the information about the drum play sound source and the information about the piano play sound source constituting a first collaboration content are mapped to the first collaboration content, the information about the drum play sound source, the information about the piano play sound source and the information about the saxophone play sound source constituting a second collaboration content are mapped to the second collaboration content, and the information about the drum play sound source, the information about the piano play sound source and the information about the first vocal sound source constituting a third collaboration content are mapped to the third collaboration content. The connection relationship among a plurality of contents may be set based on the information of each of the base content and the plurality of additional contents. That is, the tree connection relationship among a plurality of contents may be formed based on identification information of a content, identification information of another content referred to by the content and time information of the content.

When the first user device 110 selects one of the plurality of nodes, the additional content receiving unit 210 may receive a first additional content that corresponds to the selected node and is supplementary to a first collaboration content.

Figure 3B:
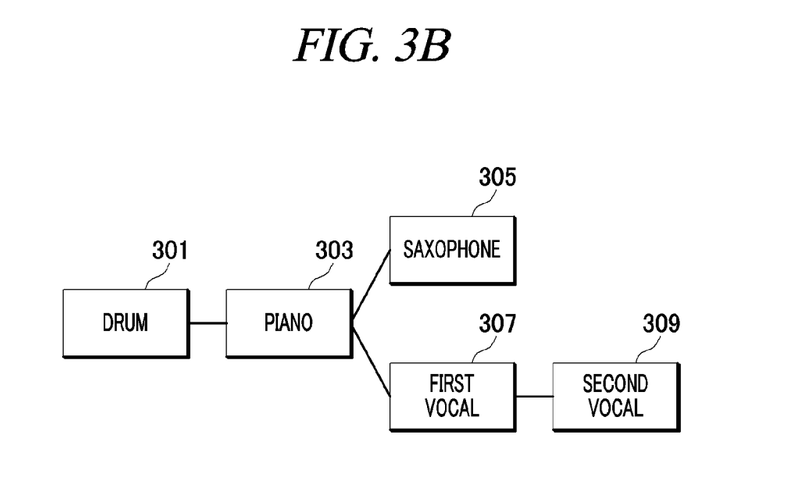

For example, referring to FIG. 3A and FIG. 3B, when the first user device 110 selects the node 307 corresponding to the first vocal sound source from among the root node 301 corresponding to the base content and the plurality of nodes 303, 305 and 307 corresponding to the plurality of collaboration contents, respectively, the additional content receiving unit 210 may receive a first additional content that corresponds to the first vocal sound source and is supplementary to a first collaboration content.

The collaboration content generating unit 220 may generate a second collaboration content based on the first additional content received from the first user device 110 and the first collaboration content selected by the first user device 110. Herein, the first additional content is set to a lower node derived from the lowermost node among a plurality of nodes corresponding to additional contents constituting the first collaboration content. That is, the node corresponding to the first additional content may be connected to the lowermost node among the plurality of nodes corresponding to the additional contents constituting the first collaboration content.

The database 200 may update the collaboration content table by mapping, to the generated second collaboration content, the information about the first collaboration content (i.e., the information about the plurality of additional contents constituting the first collaboration content) constituting the second collaboration content and the information about the first additional content.

For example, referring to FIG. 3A, FIG. 3B and FIG. 4A together, when the collaboration content generating unit 220 receives, from the first user device 110, a first additional content (second vocal sound source) that is supplementary to the third collaboration content, the collaboration content generating unit 220 may generate a fourth collaboration content by mixing the received first additional content (second vocal sound source) and the third collaboration content. Here, the second vocal sound source is set to a lower node 309 derived from the node 307 corresponding to the first vocal sound source. That is, the node 309 corresponding to the second vocal sound source may be connected to the node 307 corresponding to the first vocal sound source.

For example, as for the second vocal sound source which is the first additional content, the database 200 may store additional content information corresponding to the second vocal sound source and including "00005" as identification information of the second vocal sound source, "FALSE" as key information corresponding to a branch node, "0004" (which is the identification information of the first vocal sound source) as identification information of another additional content referred to by the second vocal sound source, "ace" as an author of the second vocal sound source and "2020/02/05, 07:07:07" as time information of the second vocal sound source.

Figure 4B:
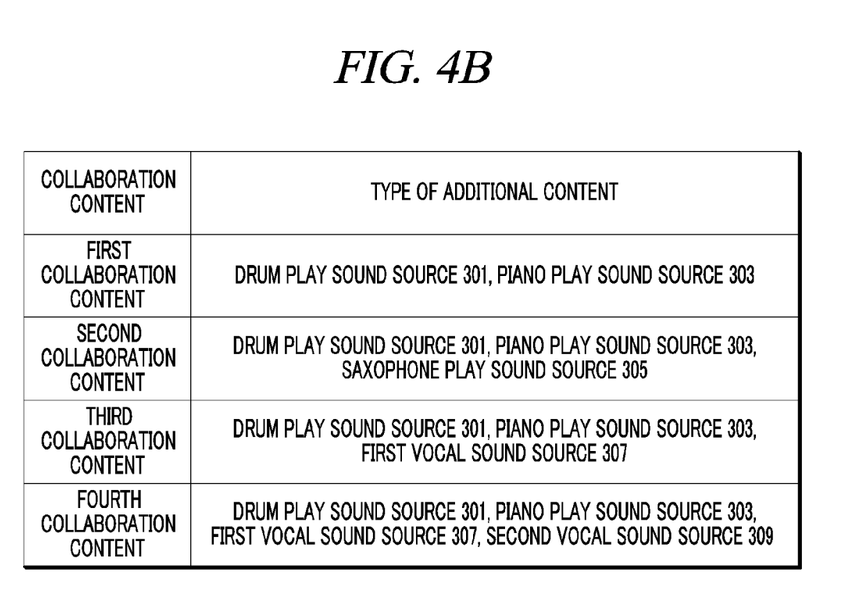

For example, referring to FIG. 3A, FIG. 4A and FIG. 4B together, the database 200 may update the collaboration content table by mapping, to the generated fourth collaboration content, the information about additional contents (i.e., the drum play sound source, the piano play sound source, the first vocal sound source) of the third collaboration content constituting the fourth collaboration content and the information about the second vocal sound source corresponding to the first additional content.

The additional content receiving unit 210 may receive, from the first user device 110, one node selected by the first user device from among the plurality of nodes and a first additional content that is supplementary to a first collaboration content including additional contents for all respective higher nodes directly or indirectly connected to the selected node. Herein, all the higher nodes directly or indirectly connected to the selected node may include a branch node.

For example, referring to FIG. 3B, when the first user device 110 selects the node 309 corresponding to the second vocal sound source, the additional content receiving unit 210 may receive, from the first user device 110, a first additional content (haegeum play sound source) that is supplementary to a first collaboration content in which the first vocal sound source corresponding to a higher node directly connected to the node 309 corresponding to the second vocal sound source and the second vocal sound source are mixed.

As another example, when the first user device 110 selects the node 309 corresponding to the second vocal sound source, the additional content receiving unit 210 may receive, from the first user device 110, a second additional content (gayageum play sound source) that is supplementary to a first collaboration content in which the piano play sound source corresponding to a higher node (serving as a branch node) indirectly connected to the selected node 309 and the second vocal sound source are mixed.

Figure 3C:
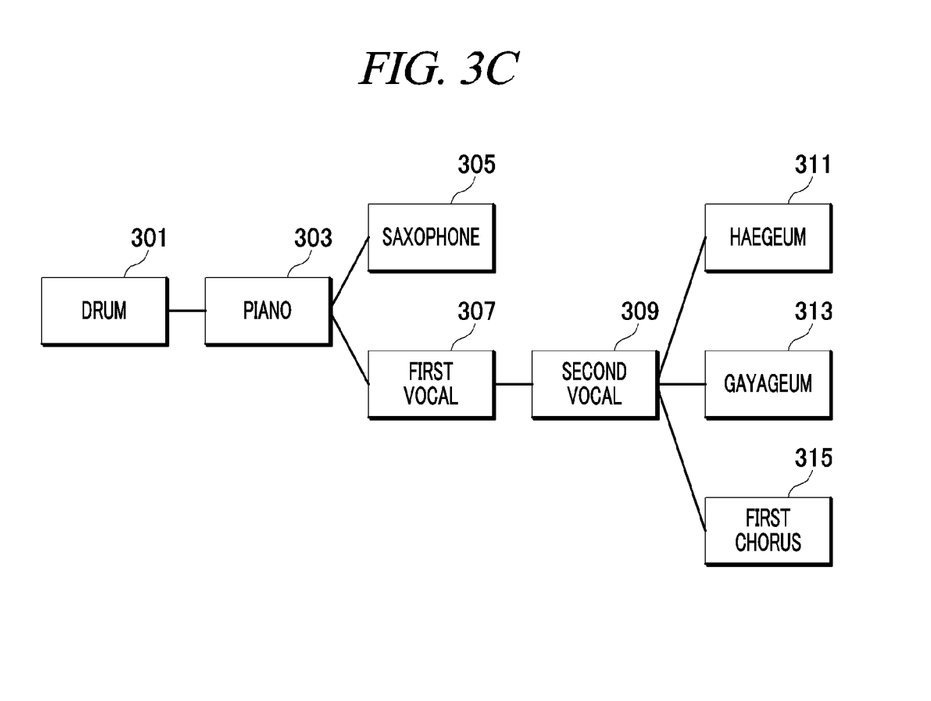

Referring to FIG. 3B and FIG. 3C together, the collaboration content generating unit 220 may generate a second collaboration content by mixing the first additional content (haegeum play sound source) received from the first user device 110 with the first vocal sound source and the second vocal sound source included in the first collaboration content.

As another example, the collaboration content generating unit 220 may generate a second collaboration content by mixing the second additional content (gayageum play sound source) received from the first user device 110 with the piano play sound source and the second vocal sound source included in the first collaboration content.

After the first user device 110 selects one of the plurality of nodes and the first user device 110 further selects another node, the additional content receiving unit 210 may receive, from the first user device 110, a first additional content that is supplementary to a first collaboration content including an additional content for the selected another node, an additional content for the selected node and additional contents for all nodes between the selected another node and the selected node. Herein, the other node may be a branch node.

For example, referring to FIG. 3B and FIG. 3C together, if the first user device 110 selects the node 390 corresponding to the second vocal sound source and the first user device 110 further selects the node 301 corresponding to the drum play sound source, the additional content receiving unit 210 may receive, from the first user device 110, a first additional content (chorus sound source) that is supplementary to a first collaboration content including the selected second vocal sound source and drum play sound source, the piano play sound source connected between the second vocal sound source and the drum play sound source, and the first vocal sound source.

The collaboration content generating unit 220 may generate a second collaboration content in which the first additional content (chorus sound source), the second vocal sound source, the drum play sound source, the piano play sound source and the first vocal sound source are mixed.

As another example, after the first user device 110 selects one of the plurality of nodes and the first user device 110 further selects another node, the additional content receiving unit 210 may receive, from the first user device 110, a first additional content that is supplementary to a first collaboration content including only an additional content for the selected another node and an additional content for the selected node. Herein, the other node may be a branch node.

For example, referring to FIG. 3B and FIG. 3C together, if the first user device 110 selects the node 390 corresponding to the second vocal sound source and the first user device 110 further selects the node 303 corresponding to the piano play sound source, the additional content receiving unit 210 may receive, from the first user device 110, a first additional content (first chorus sound source) that is supplementary to a first collaboration content including only the selected second vocal sound source and piano play sound source.

The collaboration content generating unit 220 may generate a second collaboration content by mixing the first additional content (first chorus sound source), the second vocal sound source and the piano play sound source.

Referring back to FIG. 2, the collaboration content generating unit 220 may generate a second collaboration content by mapping identification information of each of a plurality of additional contents included in the first collaboration content and identification information of the first additional content that is supplementary to the first collaboration content.

After the second collaboration content is generated, the additional content receiving unit 210 may receive, from the second user device 120, a second additional content that is supplementary to the second collaboration content.

The collaboration content generating unit 220 may generate a third collaboration content based on the second collaboration content and the second additional content.

Figure 3D:
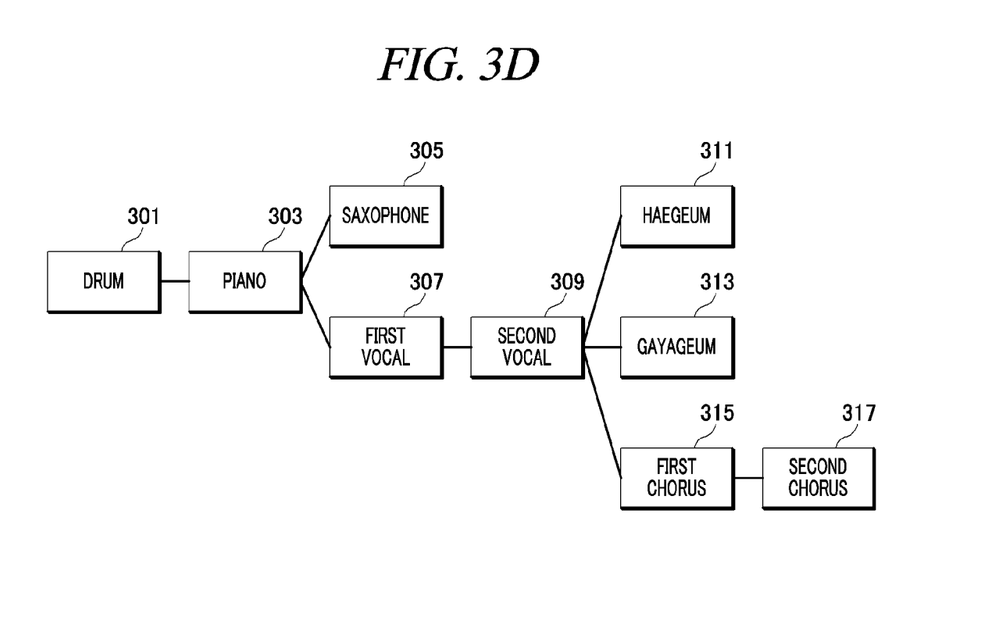

For example, referring to FIG. 3C and FIG. 3D together, after the second collaboration content in which the first additional content (first chorus sound source), the second vocal sound source and the piano play sound source are mixed is generated, the additional content receiving unit 210 may receive, from the second user device 120, a second additional content (second chorus sound source) that is supplementary to a second collaboration content.

The collaboration content generating unit 220 may generate a third collaboration content by mixing the second collaboration content and the second additional content (second chorus sound source). Here, the node corresponding to the second additional content may be connected to the lowermost node among the plurality of nodes corresponding to the additional contents constituting the third collaboration content.

As another example, when the collaboration content generating unit 220 receives, from the second user device 120, a first additional content for imparting a new effect to a previously generated first video collaboration content, which is selected by the second user device 120, or for editing the first video collaboration content, the collaboration content generating unit 220 may generate a second video collaboration content based on the first video collaboration content and the first additional content.

As yet another example, the collaboration content generating unit 220 may receive, from the second user device 120, a first additional picture content generated to be overlaid on a previously generated first picture collaboration content which is selected by the second user device 120.

In this case, the collaboration content generating unit 220 may generate a second picture collaboration content by overlaying the first additional picture content on the first picture collaboration content.

Further, the collaboration content generating unit 220 may receive, from the third user device 130, a second additional picture content generated to be overlaid on the second picture collaboration content which is selected by the third user device 130 and may generate a third picture collaboration content by overlaying the second additional picture content on the second picture collaboration content.

That is, according to the present disclosure, recently generated picture collaboration contents may be overlaid several times and new pictures are continuously produced so that a dynamic collaboration content may be generated.

As described above, collaboration content according to the present disclosure may not be static content that is completed at once but may be dynamic content that is combined based on the connection relationship among a plurality of contents.

For example, as for a picture, additional picture contents respectively generated by a plurality of users may be used as layers. The sequence of layers for the respective additional picture contents may be determined based on the time information of the additional picture contents. That is, an additional picture content with the latest time information may be put on the highest layer.

For example, as for graffiti to be drawn on a virtual wall, a first user may draw a picture on the virtual wall and then, a second user may also draw a picture on the virtual wall, which can give a paint over effect.

That is, the picture drawn by the first user becomes a part of the picture of the second user, which completes the whole picture. By repeating this process, it is possible to provide a completely different dynamic user experience.

For example, the collaboration content generating unit 220 overlays the additional picture contents based on the determined sequence of layers for the respective additional picture contents so that various combinations of new picture collaboration contents can be generated.

For example, referring to FIG. 6A to FIG. 6D, picture collaboration contents 607, 609, 611 and 615 can be dynamic contents different from each other depending on stroke information, sequence and timing information of at least two additional picture contents 601, 603, 605 and 613 used for generating the picture collaboration contents 607, 609, 611 and 615.

That is, picture collaboration contents generated by overlaying a plurality of additional picture contents based on stroke information, sequence and timing information of the additional picture contents are different from each other in meaning or impression.

Figure 6A:
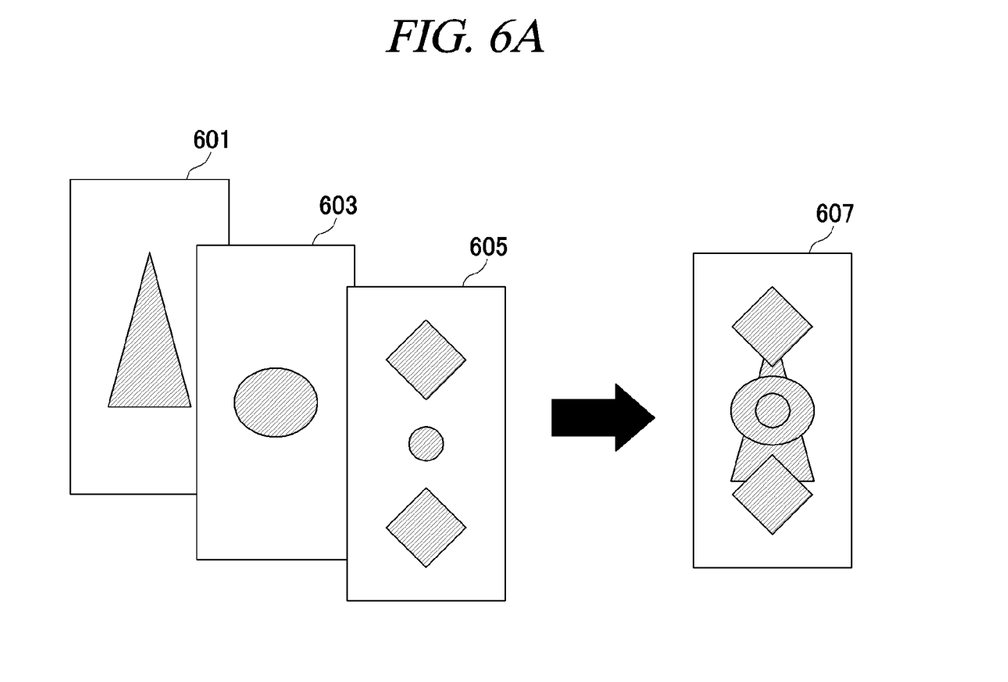
FIG. 6A to FIG. 6F are diagrams provided to explain a method for generating picture collaboration content in an asynchronous manner according to an embodiment of the present disclosure.
Figure 6B:
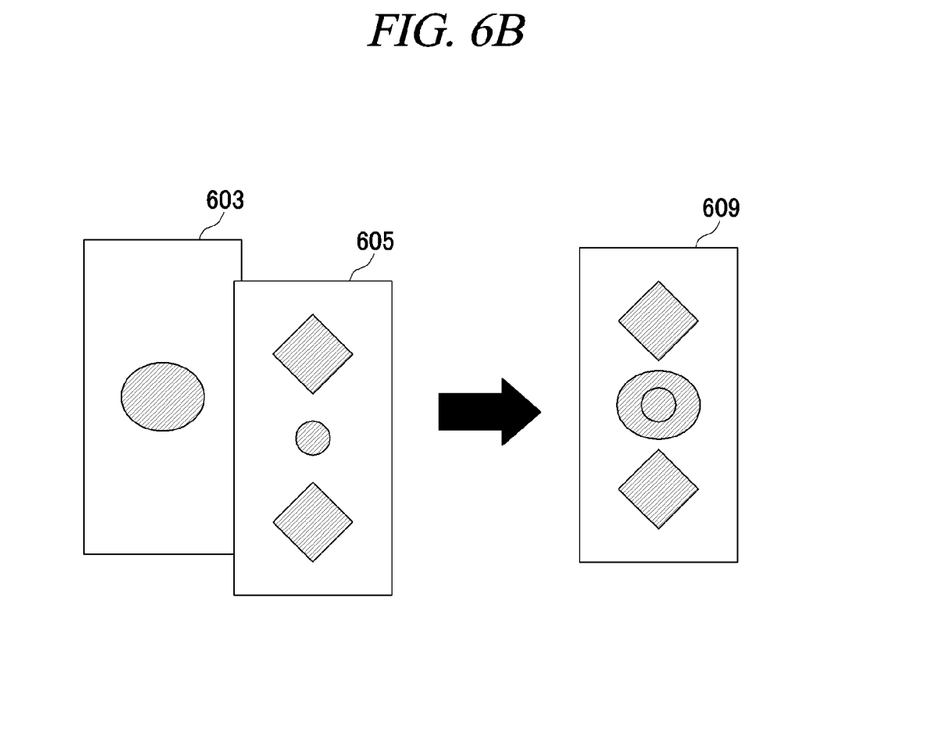
Figure 6C:
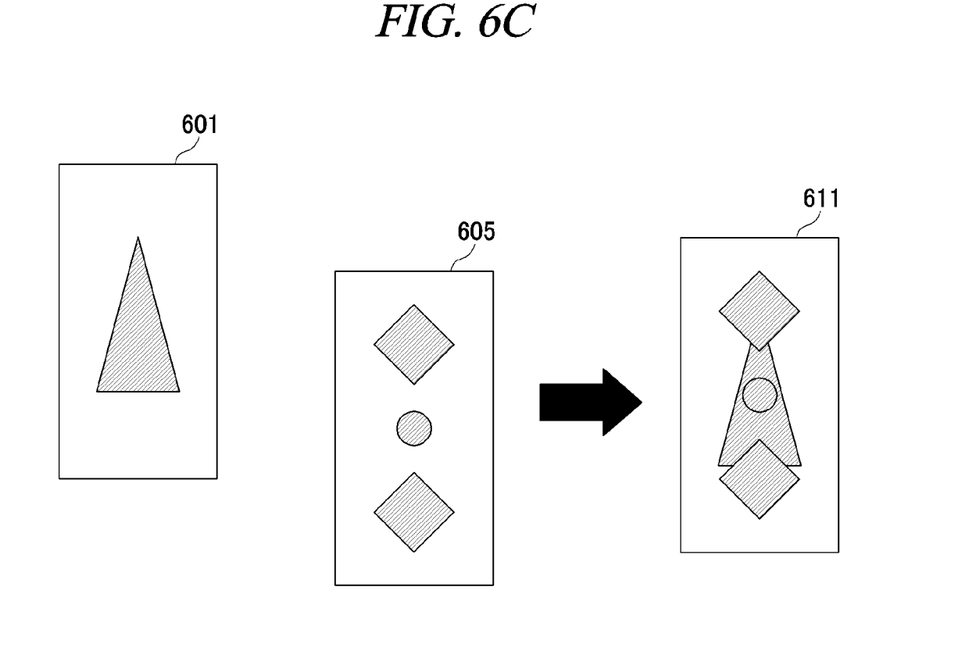
Figure 6D:
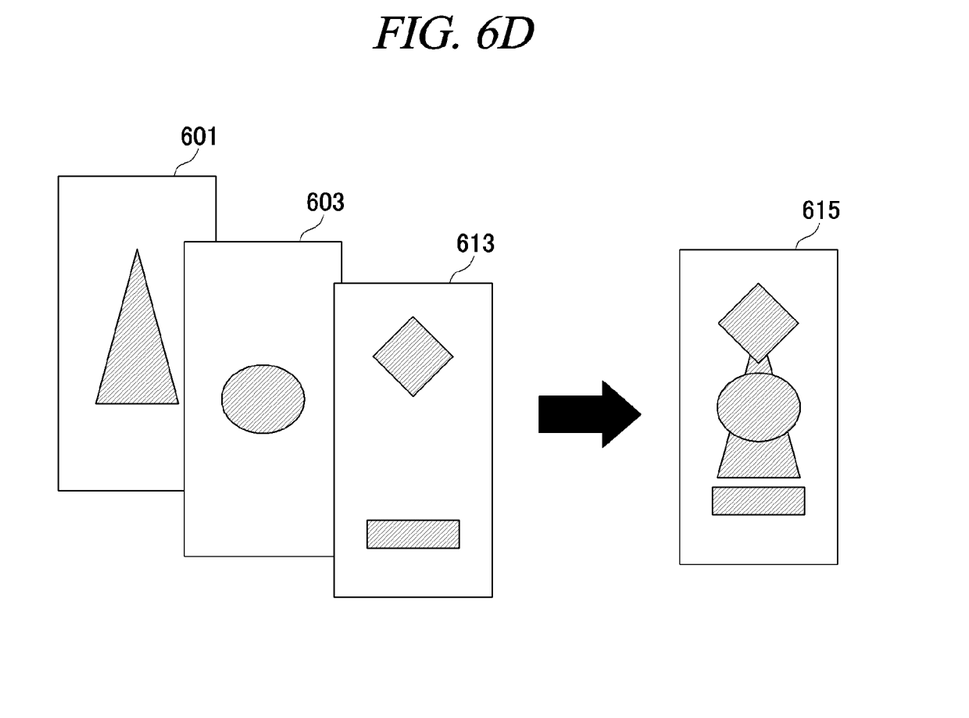
Figure 6E:
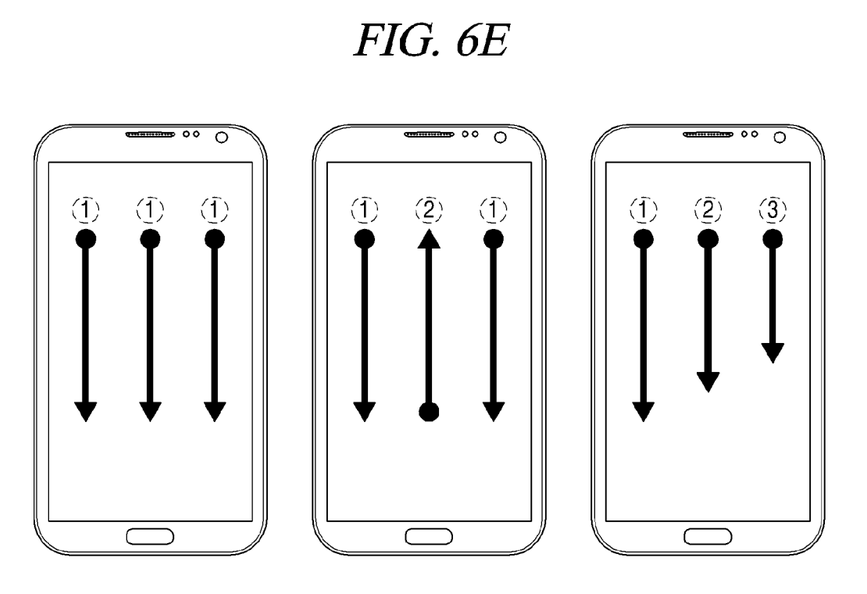
Figure 6F:
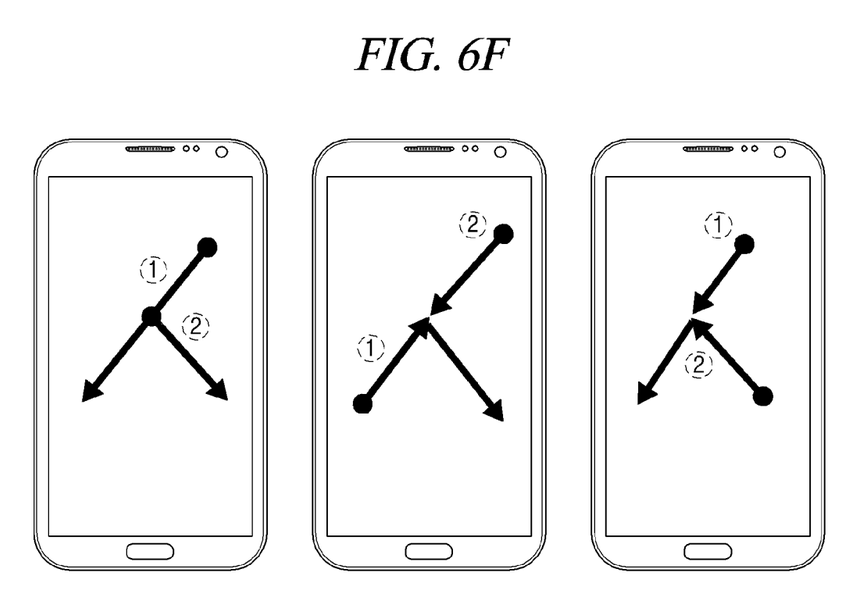

For example, FIG. 6E and FIG. 6F illustrate the drawing sequence, direction and timing information of an additional picture content on a user device.

For example, if a musical collaboration content is linked to a game, whenever an ensemble (musical collaboration content) made up of a plurality of additional contents receives a favorable evaluation from users of the game, the number of musical instruments that can be used in the ensemble may increase. For example, a musical collaboration content (in which musical additional contents generated by three users are mixed) first generated by user devices of the three users can be gradually expanded to, for example, an orchestra.

Referring back to FIG. 2, a score management unit (not shown) may receive, from a plurality of user devices, scores for a plurality of collaboration contents or additional contents included in the collaboration contents and may calculate a score for each collaboration content.

When the third user device 130 selects one of the plurality of collaboration contents, the collaboration content providing unit 230 may provide the third user device 130 with the selected collaboration content based on identification information of each of a plurality of additional contents included in the selected collaboration content. For example, when the third user device 130 selects any one node, the collaboration content providing unit 230 may provide the third user device 130 with a collaboration content corresponding to the selected node.

For example, referring to FIG. 3D, when the third user device 130 selects, from among a plurality of collaboration contents, a collaboration content in which the haegeum play sound source is mixed, the collaboration content providing unit 230 may synchronize the second vocal sound source, the piano play sound source and the drum play sound source corresponding to a plurality of additional contents included in the collaboration content and then provide the synchronized sound sources to the third user device 130.

For example, when the collaboration content providing unit 230 receives a request for musical content from the third user device 130, the collaboration content providing unit 230 may extract a collaboration content with the highest score from among the plurality of collaboration contents and then provide the extracted collaboration content to the third user device 130. Here, if the number of a plurality of additional contents included in the extracted collaboration content is greater than a predetermined threshold value, the collaboration content providing unit 230 may select an additional content to be provided to the third user device 130 from among the plurality of additional contents included in the extracted collaboration content based on time information and scores for the additional contents.

Meanwhile, it would be understood by a person with ordinary skill in the art that each of the database 200, the additional content receiving unit 210, the collaboration content generating unit 220 and the collaboration content providing unit 230 can be implemented separately or in combination with one another.

Figure 5:
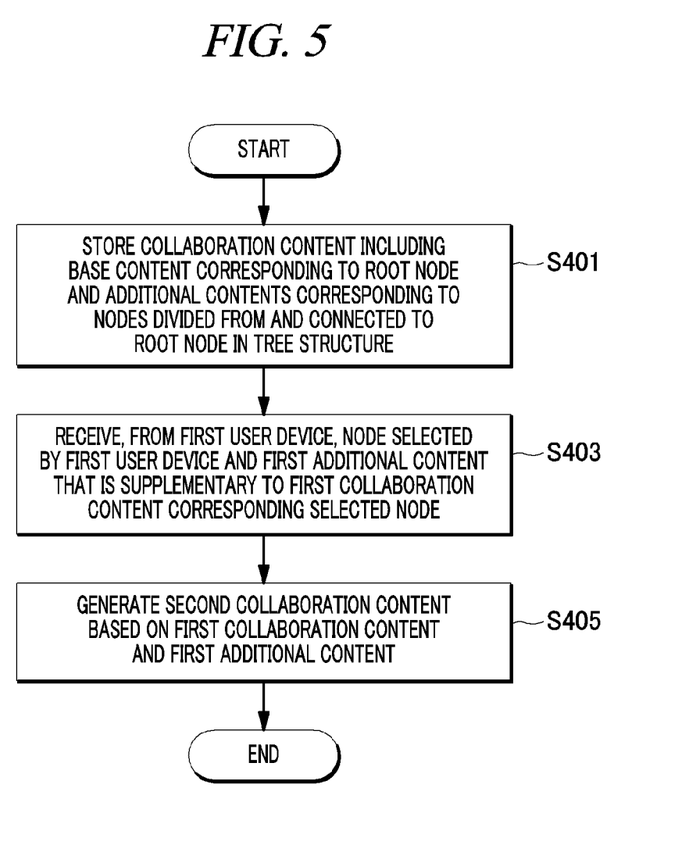
FIG. 5 is a flowchart showing a method for generating collaboration content in an asynchronous manner according to an embodiment of the present disclosure.

FIG. 5 is a flowchart showing a method for generating collaboration content in an asynchronous manner according to an embodiment of the present disclosure.

Referring to FIG. 5, in a process S501, the collaboration content-generating server 100 may store a collaboration content including a base content corresponding to a root node and a plurality of additional contents corresponding to a plurality of nodes divided from and connected to the root node in a tree structure. Herein, a collaboration content is generated based on a base content and a plurality of additional contents received at different times from a plurality of user devices.

In a process S503, when the first user device 110 selects one of the plurality of nodes, the collaboration content-generating server 100 may receive a first additional content that is supplementary to a first collaboration content corresponding to the selected node.

In a process S505, the collaboration content-generating server 100 may generate a second collaboration content based on the first collaboration content and the first additional content.

In the descriptions above, the processes S501 to S505 may be divided into additional processes or combined into fewer processes depending on an embodiment. In addition, some of the processes may be omitted and the sequence of the processes may be changed if necessary.

An aspect of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A collaboration content-generating server that generates collaboration content in an asynchronous manner, comprising:
    a database configured to store a collaboration content including a base content corresponding to a root node and a plurality of additional contents corresponding to a plurality of nodes divided from and connected to the root node in a tree structure;
    an additional content receiving unit configured to receive, from a first user device, a node selected by the first user device and a first additional content that is supplementary to a first collaboration content corresponding to the selected node; and
    a collaboration content generating unit configured to generate a second collaboration content based on the first additional content and the first collaboration content,
    wherein the collaboration content is generated based on the base content and the plurality of additional contents received at different times from a plurality of user devices.

2. The collaboration content-generating server of claim 1, wherein the database is further configured to store additional content information corresponding to each of the plurality of additional contents, and
    the additional content information includes at least one of identification information of the additional content, key information indicating whether the additional content corresponds to a branch node having a plurality of lower nodes directly connected to the additional content, identification information of another additional content located at a higher node referred to by the additional content and time information of the additional content.

3. The collaboration content-generating server of claim 1, wherein the additional content receiving unit is configured to receive, from the first user device, the first additional content that is supplementary to the first collaboration content including an additional content for the selected node and additional contents for all respective higher nodes directly or indirectly connected to the selected node.

4. The collaboration content-generating server of claim 2, wherein the additional content receiving unit is further configured to receive, from the first user device, another node by the first user device and the first additional content that is supplementary to the first collaboration content including an additional content for the selected another node, an additional content for the selected node and additional contents for all nodes between the selected another node and the selected node.

5. The collaboration content-generating server of claim 1, wherein the additional content receiving unit is further configured to receive, from the first user device by the first user device, another node and the first additional content that is supplementary to the first collaboration content including only an additional content for the selected another node and an additional content for the selected node.

6. The collaboration content-generating server of claim 4, wherein the another node is a branch node.

7. The collaboration content-generating server of claim 3, wherein the collaboration content generating unit is configured to generate the second collaboration content by mapping identification information of a plurality of additional contents included in the first collaboration content and identification information of the first additional content.

8. The collaboration content-generating server of claim 1, wherein after the second collaboration content is generated, the additional content receiving unit is further configured to receive, from a second user device, a second additional content that is supplementary to the second collaboration content.

9. The collaboration content-generating server of claim 8, wherein the collaboration content generating unit is further configured to generate a third collaboration content based on the second collaboration content and the second additional content.

10. The collaboration content-generating server of claim 1, wherein the collaboration content is a musical content generated by mixing at least one of at least two musical instrument sound sources, vocal sound sources and chorus sound sources as the plurality of additional contents.

11. The collaboration content-generating server of claim 1,
wherein the collaboration content is an image content or a video content generated by mixing at least two images as the plurality of additional contents.

12. The collaboration content-generating server of claim 1, further comprising:
a collaboration content providing unit configured to receive, from third user device, a collaboration content selected by the third user device from among a plurality of collaboration content and provide the third user device with the selected collaboration content based on identification information of each of a plurality of additional contents included in the selected collaboration content.

13. A method for generating collaboration content in an asynchronous manner by a collaboration content-generating server, comprising:
storing, in a database, a collaboration content including a base content corresponding to a root node and a plurality of additional contents corresponding to a plurality of nodes divided from and connected to the root node in a tree structure;
receiving, from a first user device, a node selected by the first user device and a first additional content that is supplementary to a first collaboration content corresponding to the selected node; and
generating a second collaboration content based on the first collaboration content and the first additional content,
wherein the collaboration content is generated based on the base content and the plurality of additional contents received at different times from a plurality of user devices.

14. The method for generating collaboration content of claim 13,
wherein the storing, in the database includes storing additional content information corresponding to each of the plurality of additional contents, and the additional content information includes at least one of identification information of the additional content, key information indicating whether the additional content corresponds to a branch node having a plurality of lower nodes directly connected to the additional content, identification information of another additional content located at a higher node referred to by the additional content and time information of the additional content.

15. The method for generating collaboration content of claim 13, further comprising:
receiving, from a second user device, a second additional content that is supplementary to the second collaboration content after the second collaboration content is generated.

16. The method for generating collaboration content of claim 15, further comprising:
generating a third collaboration content based on the second collaboration content and the second additional content.

17. The method for generating collaboration content of claim 13,
wherein the collaboration content is a musical content generated by mixing at least one of at least two musical instrument sound sources, vocal sound sources and chorus sound sources as the plurality of additional contents.

18. The method for generating collaboration content of claim 13,
wherein the collaboration content is an image content or a video content generated by mixing at least two images as the plurality of additional contents.

19. The method for generating collaboration content of claim 13, further comprising:
receiving, from third user device, a collaboration content selected by the third user device from among a plurality of collaboration content, and
providing the third user device with the selected collaboration content based on identification information of each of a plurality of additional contents included in the selected collaboration content.

* * * * *